(No Model.)
P. STEIN.
BICYCLE HANDLE.
No. 586,371. Patented July 13, 1897.
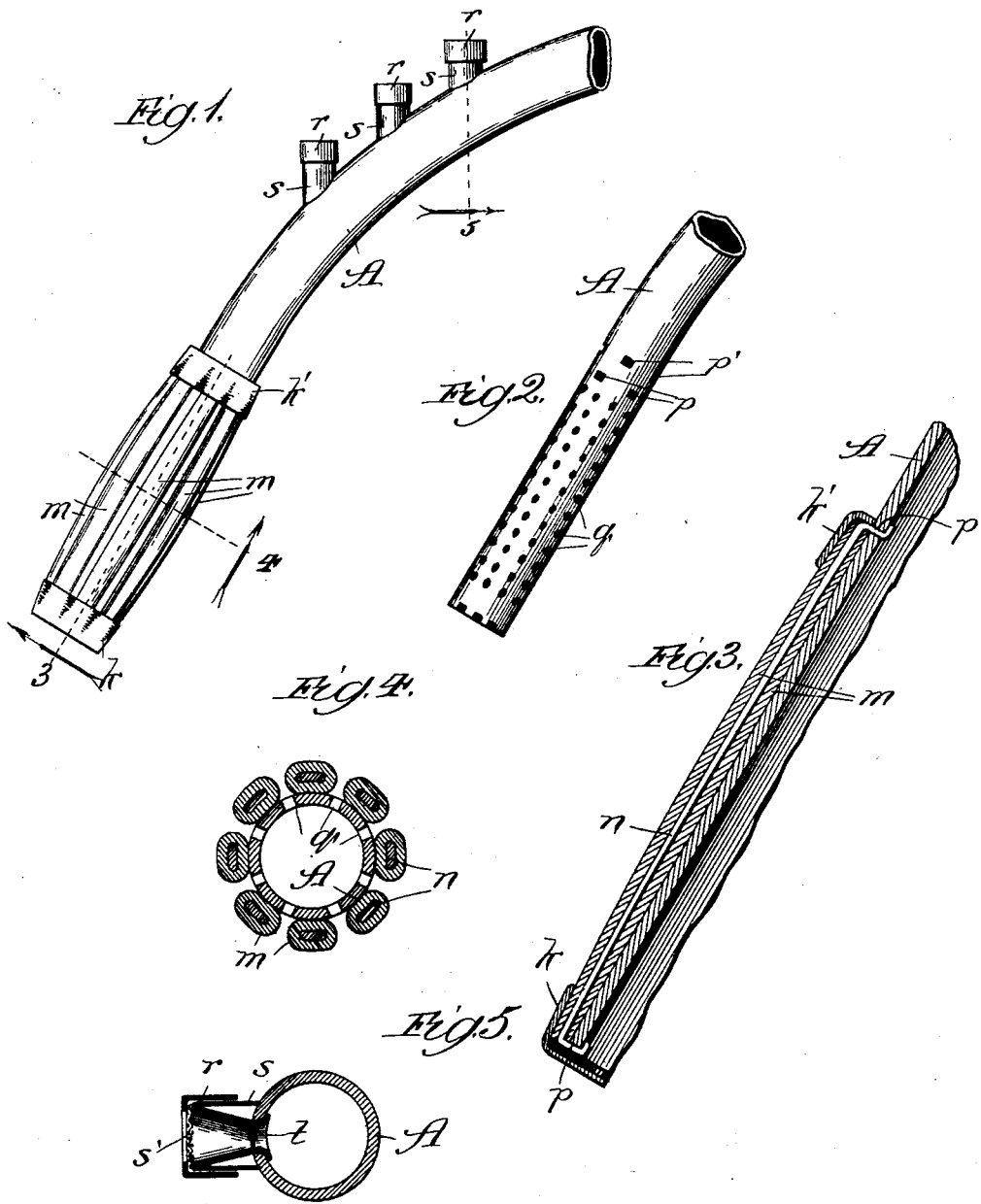
Witnesses:
Inventor:
Peter Stein,
By Dyrenforth & Dyrenforth
Att'ys
THE NORRIS PETERS CO., PHOTO-LITHO., WASHINGTON, D. C.

UNITED STATES PATENT OFFICE.

PETER STEIN, OF CHICAGO, ILLINOIS.

BICYCLE-HANDLE.

SPECIFICATION forming part of Letters Patent No. 586,371, dated July 13, 1897.

Application filed July 3, 1896. Serial No. 598,005. (No model.)

*To all whom it may concern:*

Be it known that I, PETER STEIN, a subject of the Emperor of Germany, residing at Chicago, in the county of Cook and State of Illinois, have invented a new and useful Improvement in Bicycle-Handles, of which the following is a specification.

My invention relates to an improvement in bicycle-handles whereby ventilation is supplied to the hands of the rider during action, thus enabling him to keep a good grip upon the handles without the inconvenience and loss of efficiency arising from the slipperiness caused by perspiration which attends the use of handles of the ordinary construction and without rendering the hands sore.

My invention consists in supplying ventilating-passages in the handles which will admit air to the palms of the hands; and the device illustrated in the accompanying drawings and herein described is designed to make use for such a purpose of the draft arising from the advancement of the wheel.

In the drawings, Figure 1 is a broken view of a handle constructed in accordance with my improvement; Fig. 2, a view of the outer end of the bar with the strips forming the handle removed; and Figs. 3, 4, and 5, enlarged broken sections taken at the lines 3, 4, and 5, respectively, of Fig. 1 and viewed as indicated.

A is a handle-bar formed hollow and provided on its front side with openings $t$, into which are preferably fitted nipples $s$, which may be funnel-shaped and provided at their outer ends with screens $s'$, held in place by caps or collars $r$. At its handle-receiving portion the handle-bar is provided with longitudinally-extending rows of perforations $q$ and with openings $p\ p'$ for receiving the inturned ends of preferably metal bars $n$, which are covered with strips of leather or other suitable material $m$ to form the handles. The strips are bent inward at their outer ends to engage suitable notches in the ends of the handle-bar and are held firmly clamped in position by means of ferrules $k$ and $k'$, forced over their ends.

As shown in the drawings, spaces are left between the strips forming the handle, affording longitudinal channels, and the strips are so disposed upon the bar that the openings $q$ communicate with these channels.

When the wheel is advanced, air enters the openings $t$ and passes out through the openings $q$, thus cooling the hands of the rider. The air-supply may be increased without further weakening the handle-bars by enlarging the outer ends of the funnel-shaped nipples $s$. The screens $s'$ prevent dust and insects from entering the bar.

The construction shown and described is, I believe, best adapted to fulfil its purpose; but it is evident that it may be variously modified without departing from the spirit of my invention as defined by the claims.

The arrangement of the strips of leather $m$, for instance, provides a most efficient handle, allowing the hand a good grip and to a certain extent providing for ventilation even though the other features are not present.

What I claim as new, and desire to secure by Letters Patent, is—

1. The combination of a hollow handle-bar having series of outlets at the handle and an air-inlet at its front side, a hollow nipple for said inlet, a screen for the nipple, strips of metal covered with leather, or the like, bent to engage the handle-bar and so disposed thereon as to afford longitudinal channels communicating with said series of outlets, and ferrules clamping said strips in place, substantially as and for the purpose set forth.

2. The combination of a hollow handle-bar having an air-inlet, and series of air-outlets, longitudinally-extending separable metal strips covered with leather or the like and so disposed as to afford channels communicating with said outlets, and means for securing the strips to the bar, substantially as and for the purpose described.

PETER STEIN.

In presence of—
J. H. LEE,
M. J. FROST.